United States Patent
Motoyoshi et al.

(10) Patent No.: US 10,800,879 B2
(45) Date of Patent: Oct. 13, 2020

(54) POLYCARBONATE RESIN, AND PRODUCTION METHOD AND FILM THEREOF

(71) Applicant: TEIJIN LIMITED, Osaka (JP)

(72) Inventors: Tetsuya Motoyoshi, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 54 days.

(21) Appl. No.: 16/065,228

(22) PCT Filed: Dec. 27, 2016

(86) PCT No.: PCT/JP2016/089232
§ 371 (c)(1),
(2) Date: Jun. 22, 2018

(87) PCT Pub. No.: WO2017/119404
PCT Pub. Date: Jul. 13, 2017

(65) Prior Publication Data
US 2019/0010280 A1    Jan. 10, 2019

(30) Foreign Application Priority Data

Jan. 6, 2016 (JP) ................. 2016-001016
Jan. 6, 2016 (JP) ................. 2016-001017

(51) Int. Cl.
| | | |
|---|---|---|
| C08G 64/02 | (2006.01) | |
| C08J 5/18 | (2006.01) | |
| C08G 64/16 | (2006.01) | |
| A01G 9/14 | (2006.01) | |
| B65D 65/38 | (2006.01) | |
| C08G 64/30 | (2006.01) | |

(52) U.S. Cl.
CPC ....... *C08G 64/1691* (2013.01); *A01G 9/1407* (2013.01); *A01G 9/1438* (2013.01); *B65D 65/38* (2013.01); *C08G 64/0216* (2013.01); *C08G 64/305* (2013.01); *C08J 5/18* (2013.01); *C08J 2369/00* (2013.01)

(58) Field of Classification Search
CPC ..................................................... C08G 64/02
USPC ....................................................... 528/201
See application file for complete search history.

(56) References Cited

U.S. PATENT DOCUMENTS

| | | |
|---|---|---|
| 2006/0149024 A1 | 7/2006 | Ono et al. |
| 2010/0105854 A1 | 4/2010 | Miyake et al. |
| 2010/0184884 A1 | 7/2010 | Miyake et al. |
| 2010/0190953 A1 | 7/2010 | Fuji et al. |
| 2012/0164444 A1 | 6/2012 | Kinoshita |
| 2013/0296526 A1 | 11/2013 | Namiki et al. |
| 2014/0350208 A1 | 11/2014 | Motoyoshi et al. |

FOREIGN PATENT DOCUMENTS

| | | |
|---|---|---|
| JP | 8-302004 | 11/1996 |
| JP | 2008-24919 | 2/2008 |
| JP | 2008/108492 | 9/2008 |
| JP | 2008-291053 | 12/2008 |
| JP | 2008-291054 | 12/2008 |
| JP | 2008-291055 | 12/2008 |
| JP | 2011-500925 | 1/2011 |
| JP | 2011-21171 | 2/2011 |
| JP | 2011-21172 | 2/2011 |
| JP | 2012-153886 | 8/2012 |
| JP | 2014-9332 | 1/2014 |

(Continued)

OTHER PUBLICATIONS

International Preliminary Report on Patentability dated Jul. 10, 2018 in International (PCT) Application No. PCT/JP2016/089232.

(Continued)

*Primary Examiner* — Duc Truong
(74) *Attorney, Agent, or Firm* — Wenderoth, Lind & Ponack, L.L.P.

(57) ABSTRACT

To provide a polycarbonate resin having an excellent hue and high heat stability, and a production method and a film thereof.

The polycarbonate resin has a carbonate constituent unit represented by the following formula (A), wherein the resin contains a terminal group represented by the following formula (1) or (2) and 0.1 to 500 ppm of an aromatic monohydroxy compound.

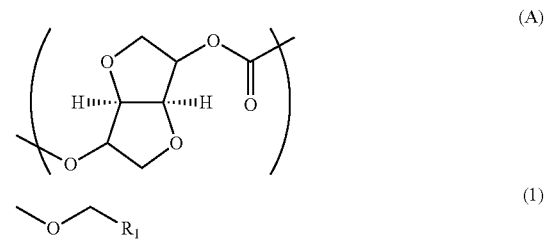

(In the formula (1), $R_1$ is an alkyl group having 6 to 15 carbon atoms which may be substituted.)

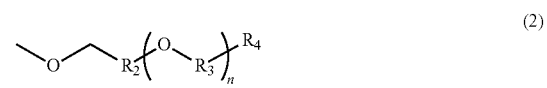

(In the formula (2), $R_2$ and $R_3$ are each independently an alkylene group having 1 to 12 carbon atoms which may be substituted. $R_4$ is a hydrogen atom or alkyl group having 1 to 12 carbon atoms which may be substituted. n is an integer of 1 to 20.)

13 Claims, No Drawings

(56) References Cited

FOREIGN PATENT DOCUMENTS

| JP | 2014-23508 | 2/2014 |
| JP | 2014-80604 | 5/2014 |
| JP | 2014-133851 | 7/2014 |
| WO | 2004/111106 | 12/2004 |
| WO | 2008/149872 | 12/2008 |
| WO | 2009/052463 | 4/2009 |
| WO | 2011/021720 | 2/2011 |
| WO | 2013/100163 | 7/2013 |

OTHER PUBLICATIONS

International Search Report dated Mar. 21, 2017 in International (PCT) Application No. PCT/JP2016/089232.

POLYCARBONATE RESIN, AND PRODUCTION METHOD AND FILM THEREOF

TECHNICAL FIELD

The present invention relates to a polycarbonate resin having an excellent hue and high heat stability, and a production method and a film thereof.

BACKGROUND ART

Due to concerns about the depletion of oil resources and an increasing amount of carbon dioxide in air causing global warming, a great deal of attention is now paid to biomass resources whose raw materials do not depend on oil and which materialize "carbon neutral" without increasing the amount of carbon dioxide even when they are burnt. In the field of polymers, biomass plastics produced from the biomass resources are being developed energetically.

One of typical examples of the biomass plastics is polylactic acid. Since polylactic acid has relatively high heat resistance and mechanical properties among biomass plastics, its use is spreading to tableware, packaging materials and miscellaneous goods. Further, its potential to be used as an industrial material is now under study. However, for use as an industrial material, polylactic acid has a problem that it does not have sufficiently high heat resistance and is inferior in moldability as it has low crystallinity as a crystalline polymer when a molded article is to be obtained by injection molding having high productivity.

A polycarbonate resin produced from a raw material obtained from an ether diol residue which can be produced from carbohydrate is under study as an amorphous polycarbonate resin having high heat resistance and obtained from a biomass resource. Particularly, studies have been made to incorporate mainly isosorbide as a monomer into a polycarbonate.

There is proposed a polycarbonate resin having high heat resistance and moldability by copolymerizing isosorbide with an aliphatic dihydroxy compound (Patent Document 1, Patent Document 2). However, an aliphatic polycarbonate has a disadvantage that it has such low heat stability that it is easily deteriorated by heat as compared with an aromatic polycarbonate. Therefore, polymerization at a high temperature is difficult. As compared with an aromatic dihydroxy compound, the reactivity of an aliphatic dihydroxy compound is high, whereby phenol as a by-product is not completely distilled off and mostly remains in a polymer. Therefore, there is proposed a method in which the amount of phenol is reduced in an extrusion step or by using a horizontal reactor (Patent Document 3, Patent Document 4). However, even in these proposals, the effect of reducing the amount of phenol is unsatisfactory, whereby the deterioration of hue may occur at the time of extrusion. Further, since a large number of aromatic groups are existent at the terminal, ultraviolet transmittance is low.

Although there is proposed a polycarbonate whose terminal is modified to improve water absorption and moldability, the residual phenol and hue are not taken into consideration (Patent Document 5).

A film having a high transmittance at an ultraviolet range is desired as a film for agricultural houses. For example, a film having a high transmittance at an ultraviolet range is needed for the biosynthesis of the anthocyanin of an eggplant and the cultivation of strawberries for pollination crossing by bees detecting ultraviolet light. A film having a high transmittance at a wavelength of 248 nm of a KrF excimer laser is desired as a dust-proof film for photomasks in a photolithography process. Further, a film having a high ultraviolet transmittance is desired for ultraviolet sterilization after food is packaged therein as a food packaging film.

PRIOR ART DOCUMENTS

Patent Documents (Patent Document 1) WO2004/111106
(Patent Document 2) JP-A 2008-24919
(Patent Document 3) JP-A 2014-80604
(Patent Document 4) JP-A 2014-9332
(Patent Document 5) WO2008/108492

DISCLOSURE OF THE INVENTION

Problem to be Solved by the Invention

It is an object of the present invention to provide a polycarbonate resin having an excellent hue and high heat stability and a production method thereof. It is another object of the present invention to provide a film which has a high ultraviolet transmittance and is suitable for use as a film for agricultural houses, dust-proof film or food packaging film.

Means for Solving the Problem

The inventors of the present invention conducted intensive studies and found that, when a polycarbonate resin having a carbonate constituent unit derived from a specific aliphatic dihydroxy compound typified by isosorbide as the main chain is to be produced, the polymerization reaction time can be adjusted by containing a specific amount of a specific alcohol compound during a polymerization reaction, whereby a polycarbonate resin containing a terminal group derived from the specific alcohol compound having a low content of an aromatic monohydroxy compound is obtained, and the polycarbonate resin is excellent in hue and heat stability. The inventors of the present invention also found that the polycarbonate resin has high ultraviolet transmittance and is suitable for use as a film for agricultural houses, dust-proof film or food packaging film.

That is, according to the present invention, the object of the present invention is attained as follows.

1. A polycarbonate resin having a carbonate constituent unit represented by the following formula (A), wherein the polycarbonate resin contains a terminal group represented by the following formula (1) or (2) and 0.1 to 500 ppm of an aromatic monohydroxy compound.

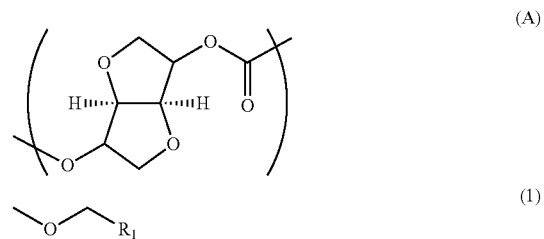

(In the formula (1), $R_1$ is an alkyl group having 6 to 15 carbon atoms which may be substituted, alkoxy group having 6 to 15 carbon atoms which may be substituted, aryl group having 6 to 14 carbon atoms which may be substituted, alkenyl group having 6 to 15 carbon atoms which may be substituted, or

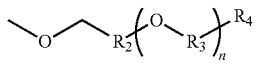
(2)

(In the formula (2), $R_2$ and $R_3$ are each independently an alkylene group having 1 to 12 carbon atoms which may be substituted, arylene group having 6 to 14 carbon atoms which may be substituted, alkenylene group having 2 to 12 carbon atoms which may be substituted, arylalkylene group having 7 to 15 carbon atoms which may be substituted, or alkylarylene group having 7 to 15 carbon atoms which may be substituted. $R_4$ is a hydrogen atom, alkyl group having 1 to 12 carbon atoms which may be substituted, aryl group having 6 to 14 carbon atoms which may be substituted, alkenyl group having 2 to 12 carbon atoms which may be substituted, or aralkyl group having 7 to 15 carbon atoms which may be substituted. n is an integer of 1 to 20.)

2. The polycarbonate resin in the above paragraph 1, wherein the content of the carbonate constituent unit represented by the formula (A) is 50 to 94 mol % based on the total of all carbonate constituent units.

3. The polycarbonate resin in the above paragraph 1 which contains a carbonate constituent unit represented by the following formula (B-1), the molar ratio (A/B-1) of the unit (A) and the unit (B-1) being 60/40 to 90/10.

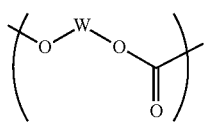
(B-1)

{In the above formula, W is an alkylene group having 2 to 30 carbon atoms, cycloalkylene group having 6 to 30 carbon atoms or —CH$_2$—Z—CH$_2$— (Z is a cycloalkylene group having 6 to 30 carbon atoms.).}

4. The polycarbonate resin in the above paragraph 1, wherein the formula (A) represents a carbonate constituent unit derived from isosorbide.

5. The polycarbonate resin in the above paragraph 1, wherein the content of the terminal group represented by the formula (1) or (2) is 10 to 90 mol % based on the total of all terminal groups.

6. The polycarbonate resin in the above paragraph 1, wherein the specific viscosity of a 20° C. methylene chloride solution of the polycarbonate resin is 0.18 to 0.5.

7. A method of producing the polycarbonate resin in the above paragraph 1, comprising the step of reacting a dihydroxy compound containing isosorbide, a carbonic diester and an alcohol compound represented by the following formula (a) or (b).

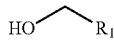
(a)

(In the above formula, $R_1$ is as defined in the above formula (1).)

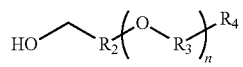
(b)

(In the above formula, $R_2$, $R_3$, $R_4$ and n are as defined in the above formula (2).)

8. The production method in the above paragraph 7, wherein the alcohol compound represented by the formula (a) or (b) is reacted in an amount of 0.1 to 5 mol % based on the total of all dihydroxy compounds.

9. The production method in the above paragraph 7, wherein the alcohol compound represented by the formula (a) or (b) has a boiling point at normal pressure of 180 to 300° C.

10. A film made of the polycarbonate resin in the above paragraph 1.

11. The film made of the polycarbonate resin in the above paragraph 1, wherein $R_1$ is an alkyl group having 6 to 15 carbon atoms which may be substituted or alkoxy group having 6 to 15 carbon atoms which may be substituted in the formula (1), and $R_2$ and $R_3$ are each independently an alkylene group having 1 to 12 carbon atoms which may be substituted, $R_4$ is a hydrogen atom or alkyl group having 1 to 12 carbon atoms which may be substituted, and n is an integer of 1 to 20 in the formula (2).

12. The film in the above paragraph 11 which has a transmittance at 260 nm of not less than 30% and a transmittance at 280 nm of not less than 20%.

13. The film in the above paragraph 11 which is a film for agricultural houses, dust-proof film or food packaging film.

Effect of the Invention

The polycarbonate resin of the present invention is excellent in hue and heat stability. The film of the present invention has excellent ultraviolet transmittance.

PRACTICAL EMBODIMENT OF THE INVENTION

The present invention will be described in detail hereinunder.

<Polycarbonate Resin>

(Unit (A))

The polycarbonate resin of the present invention contains a carbonate constituent unit (A) represented by the following formula (A). The content of the unit (A) is preferably not less than 15 mol %, more preferably not loess than 30 mol %, much more preferably not less than 50 mol %, particularly preferably not less than 60 mol % based on the total of all recurring units. The upper limit of the content of the unit (A) is preferably 94 mol %, more preferably 90 mol %, much more preferably 87 mol %, particularly preferably 85 mol % based on the total of all the recurring units. The content of the carbonate constituent unit represented by the formula (A) is preferably 50 to 94 mol % based on the total of all carbonate constituent units.

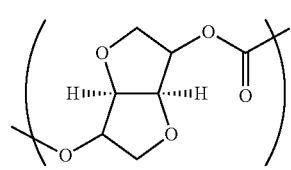
(A)

The unit (A) is derived from an aliphatic diol having an ether group as shown in the above formula (A). The above formula (A) is a material which is derived from a diol having an ether bond among biomass resources and has high heat resistance and pencil hardness.

Examples of the above formula (A) are units (A1), (A2) and (A3) which are represented by the following formulas and stereoisomeric to one another.

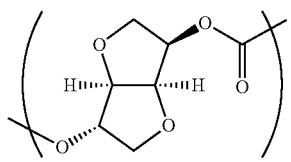
(A1)

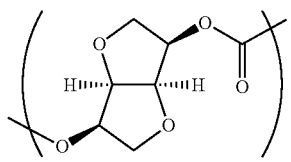
(A2)

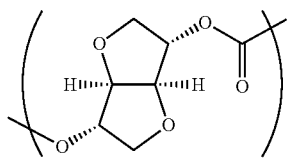
(A3)

They are ether diols derived from carbohydrate, obtained from the biomass of the natural world and called "renewable sources". Aliphatic diols having an ether group deriving the units (A1), (A2) and (A3) are called "isosorbide", "isomannide" and "isoidide", respectively. Isosorbide is obtained by hydrogenating D-glucose obtained from starch and dehydrating the obtained product. The other ether diols are obtained from a similar reaction except for the starting material.

The unit derived from isosorbide (1,4:3,6-dianhydro-D-sorbitol) out of isosorbide, isomannide and isoidide is particularly preferred because it is easily produced and has excellent heat resistance.

(Unit (B-1))

As a preferred mode of the polycarbonate resin of the present invention, there is a copolycarbonate resin which contains the above unit (A) and a unit (B-1) represented by the following formula, the total content of the unit (A) and the unit (B-1) being preferably not less than 70 mol %, more preferably not less than 80 mol %, much more preferably not less than 90 mol %, particularly preferably not less than 95 mol %, most preferably 100 mol % based on the total of all the units.

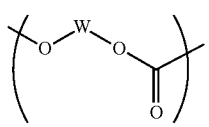
(B-1)

(In the above formula, W is an alkylene group having 2 to 30 carbon atoms, cycloalkylene group having 6 to 30 carbon atoms or —$CH_2$—Z—$CH_2$— (In the formula, Z is a cycloalkylene group having 6 to 30 carbon atoms.).)

The number of carbon atoms of the alkylene group having 2 to 30 carbon atoms is preferably 4 to 24, more preferably 6 to 20, much more preferably 8 to 12. Examples of the alkylene group include ethylene group, trimethylene group, butylene group, pentylene group, hexylene group, octylene group, nonylene group, decylene group, undecylene group and dodecylene group.

The number of carbon atoms of the cycloalkylene group having 6 to 30 carbon atoms is preferably 6 to 24, more preferably 6 to 20. Examples of the cycloalkylene group include cyclohexylene group, cyclooctylene group, cyclononylene group, cyclodecylene group, cycloundecylene group and cyclododecylene group.

Z in the group represented by —$CH_2$—Z—$CH_2$— is a cycloalkylene group having 6 to 30 carbon atoms. The number of carbon atoms of the cycloalkylene group having 6 to 30 carbon atoms is preferably 6 to 24, more preferably 6 to 20. Examples of the cycloalkylene group include cyclohexylene group, cyclooctylene group, cyclononylene group, cyclodecylene group, cycloundecylene group and cyclododecylene group.

The unit (B-1) is a carbonate unit derived from at least one compound selected from the group consisting of an aliphatic diol compound and an alicyclic diol compound.

The aliphatic diol compound is preferably a linear aliphatic diol compound. A linear aliphatic diol compound having preferably 4 to 24 carbon atoms, more preferably 6 to 20 carbon atoms, much more preferably 8 to 12 carbon atoms is used.

As the alicyclic diol compound, an alicyclic diol compound having preferably 6 to 24 carbon atoms, more preferably 6 to 20 carbon atoms is used.

Examples of the linear aliphatic diol compound include ethylene glycol, 1,3-propanediol, 1,4-butanediol, 1,5-pentanediol, neopentyl glycol, 1,6-hexanediol, 1,7-heptanediol, 1,8-octanediol, 1,9-nonanediol, 2-ethyl-1,6-hexanediol, 2,2,4-trimethyl-1,6-hexanediol, 1,10-decanediol, 1,12-dodecanediol, hydrogenated dilinoleyl glycol and hydrogenated dioleyl glycol. Out of these, 1,6-hexanediol, 1,9-nonanediol, 1,10-decanediol and 1,12-dodecanediol are preferred, and 1,9-nonanediol, 1,10-decanediol and 1,12-dodecanediol are particularly preferred.

Examples of the alicyclic diol compound include cyclohexanediols such as 1,2-cyclohexanediol, 1,3-cyclohexanediol, 1,4-cyclohexanediol and 2-methyl-1,4-cyclohexanediol. Further, 1,3-adamantanediol, 2,2-adamantanediol, 2,2,4,4-tetramethyl-1,3-cyclobutanediol and 3,9-bis(2-hydroxy-1,1-dimethylethyl)-2,4,8,10-tetraoxaspiro[5.5]undecane are also included.

Examples of the compound represented by OH—$CH_2$—Z—$CH_2$—OH include cyclohexanedimethanols such as 1,2-cyclohexanedimethanol, 1,3-cyclohexanedimethanol and 1,4-cyclohexanedimethanol; and norbornane dimethanols such as 2,3-norbornane dimethanol and 2,5-norbornane dimethanol. Further, tricyclodecane dimethanol, pentacyclopentadecane dimethanol and decaline dimethanol are also included.

Out of these, 1,4-cyclohexanedimethanol, tricyclodecane dimethanol and 3,9-bis(2-hydroxy-1,1-dimethylethyl)-2,4,8,10-tetraoxaspiro[5.5]undecane are preferred.

These aliphatic diol compounds and alicyclic diol compounds may be used alone or in combination of two or more. The diols used in the present invention may be used in combination with an aromatic diol as long as the effect of the present invention is not impaired. Examples of the aromatic diol compound include α,α'-bis(4-hydroxyphenyl)-m-diisopropylbenzene (bisphenol M), 9,9-bis(4-hydroxy-3-methylphenyl) fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenyl sulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF) and 1,1-bis(4-hydroxyphenyl)decane.

Preferably, the polycarbonate resin of the present invention contains the unit (A) and further the unit (B-1). The molar ratio (A/B-1) of the unit (A) and the unit (B-1) is preferably 15/85 to 99/1. When the molar ratio (A/B-1) is 15/85 to 99/1, the obtained polycarbonate resin has high heat resistance, appropriate melt viscosity, high moldability and accordingly excellent impact resistance. The molar ratio (A/B-1) of the unit (A) and the unit (B-1) is preferably 30/70 to 98/2, more preferably 40/60 to 96/4, much more preferably 50/50 to 95/5, particularly preferably 60/40 to 90/10. The molar ratio of the recurring units is calculated by measuring with the proton NMR of the JNM-AL400 of JEOL Ltd.

When the polycarbonate resin of the present invention is composed of only the unit (A) and the unit (B-1), the content of the unit (A) is preferably 50 to 94 mol % based on 100 mol % of the total of the unit (A) and the unit (B-1). The lower limit of the content of the unit (A) is preferably 60 mol %, more preferably 65 mol %, much more preferably 70 mol %. The upper limit of the content of the unit (A) is preferably 90 mol %, more preferably 87 mol %, much more preferably 85 mol %. The remainder is the unit (B-1).

The copolycarbonate resin containing the unit (A) and the unit (B-1) can be produced by a method described in "polycarbonate resin production method" which will be described hereinafter.

(Unit (B-3))

As a preferred mode of the polycarbonate resin of the present invention, there is a copolycarbonate resin which contains the above unit (A) and a unit (B-3) represented by the following formula (B-3), the total content of the unit (A) and the unit (B-3) being preferably not less than 80 mol %, more preferably not less than 90 mol % based on the total of all recurring units.

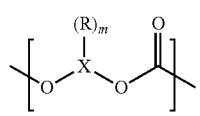
(B-3)

In the above formula, X is an alkylene group having 3 to 20 carbon atoms or cycloalkylene group having 3 to 20 carbon atoms. R is an alkyl group having 1 to 20 carbon atoms or cycloalkyl group having 3 to 20 carbon atoms. m is an integer of 1 to 10.

R is a substituent substituting X. For convenience' sake, X is called "divalent group having no substituent R. The valence of X is dependent on m which is the number of substituents R and becomes (2+m). For example, when m is 1, i.e., one substituent R substitutes X, X becomes trivalent. Similarly, when m is 2, X is tetravalent, when m is 3, X is pentavalent, when m is 4, X is hexavalent, when m is 5, X is heptavalent, when m is 6, X is octavalent, when m is 7, X is nonavalent, when m is 8, X is decavalent, when m is 9, X is undecavalent and when m is 10, X is dodecavalent.

The unit (B-3) is a unit derived from an aliphatic diol having a side-chain alkyl group or a side-chain cycloalkyl group.

The total number of carbon atoms of the unit (B-3) is preferably 4 to 12, more preferably 5 to 10. When the unit (B-3) has the above number of carbon atoms, HDT (deflection temperature under load) of the polycarbonate resin is kept high.

The total number of carbon atoms of X (number of main-chain carbon atoms) and carbon atoms of R (number of side-chain carbon atoms) of the unit (B-3) preferably satisfies the following formula (i), more preferably the following formula (i-a), much more preferably the following formula (i-b). When the following formula (i) is satisfied, boiling water resistance becomes high and water absorption can be greatly reduced advantageously.

$$0.3 \leq \text{(number of main-chain carbon atoms)/(number of side-chain carbon atoms)} \leq 8 \quad \text{(i)}$$

$$0.4 \leq \text{(number of main-chain carbon atoms)/(number of side-chain carbon atoms)} \leq 5 \quad \text{(i-a)}$$

$$0.5 \leq \text{(number of main-chain carbon atoms)/(number of side-chain carbon atoms)} \leq 2 \quad \text{(i-b)}$$

(X in Unit (B-3))

In the formula (B-3), X is an alkylene group having 3 to 20 carbon atoms or cycloalkylene group having 3 to 20 carbon atoms.

X is an alkylene group having preferably 3 to 12 carbon atoms, more preferably 3 to 8 carbon atoms, much more preferably 3 to 6 carbon atoms. Examples of the alkylene group include propylene group, butylene group, pentylene group, hexylene group, heptylene group and octylene group.

X is a cycloalkylene group having preferably 3 to 12 carbon atoms, more preferably 3 to 8 carbon atoms, much more preferably 3 to 6 carbon atoms. Examples of the cycloalkylene group include cyclopropylene group, cyclobutylene group, cyclopentylene group, cyclohexylene group, cycloheptylene group and cyclooctylene group.

(R in Unit (B-3))

In the formula (B-3), R is an alkyl group having 1 to 20 carbon atoms or cycloalkyl group having 3 to 20 carbon atoms.

R is an alkyl group having preferably 1 to 12 carbon atoms, more preferably 1 to 8 carbon atoms. Examples of the alkyl group include methyl group, ethyl group, propyl group, butyl group, pentyl group, hexyl group, heptyl group and octyl group.

R is a cycloalkyl group having preferably 3 to 12 carbon atoms, more preferably 3 to 8 carbon atoms. Examples of the cycloalkyl group include cyclopropyl group, cyclobutyl group, cyclopentyl group, cyclohexyl group, cycloheptyl group and cyclooctyl group.

(m in Unit (B-3))

In the formula (B-3), m is an integer of 1 to 10, preferably 2 to 8, more preferably 2 to 5.

(When X in Unit (B-3) is an Alkylene Group Having 3 to 20 Carbon Atoms)

Preferably, in the unit (B-3), X is an alkylene group having 3 to 20 carbons, R is an alkyl group having 1 to 4 carbon atoms, and m is an integer of 2 to 8. Preferably, in the unit (B), X is an alkylene group having 3 to 5 carbon atoms, R is an alkyl group having 1 to 4 carbon atoms, and m is an integer of 1 to 2.

In the unit (B-3), —X{—(R)$_m$}— is preferably a unit (Ba) represented by the following formula.

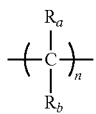

(Ba)

n is an integer of 2 to 6, preferably 3 to 5. An "n" number of $R_a$'s are each independently selected from hydrogen atom and alkyl group having 1 to 4 carbon atoms. An "n" number of $R_b$'s are each independently selected from hydrogen atom and alkyl group having 1 to 4 carbon atoms. Preferably, one or two out of the "n" number of $R_a$'s and the "n" number of $R_b$'S are alkyl groups having 1 to 4 carbon atoms, and the others are hydrogen atoms.

In the unit (B-3), —X{—(R)$_m$}— is preferably a 2-n-butyl-2-ethyl-1,3-propanediyl group, 2,4-diethyl-1,5-pentanediyl group or 3-methyl-1,5-pentanediyl group.

(When X in Unit (B-3) is a Cycloalkylene Group Having 3 to 20 Carbon Atoms)

Preferably, in the above formula (B-3), X is a cycloalkylene group having 4 to 5 carbon atoms, R is an alkyl group having 1 to 10 carbon atoms, and m is an integer of 3 to 12.

The unit (B-3) is preferably a unit (Bb) represented by the following formula.

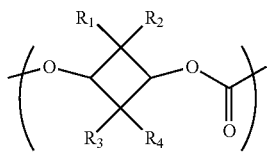

(Bb)

$R_1$, $R_2$, $R_3$ and $R_4$ are alkyl groups which may be the same or different, the total number of carbon atoms of $R_1$ to $R_4$ is 4 to 10, and $R_1$ and $R_2$ may be bonded together and $R_3$ and $R_4$ may be bonded together to form a carbon ring. In the unit (Bb), $R_1$, $R_2$, $R_3$ and $R_4$ are preferably each independently a methyl group, ethyl group or propyl group.

The unit (B-3) is preferably a unit (Bb-i) represented by the following formula.

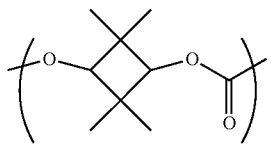

(Bb-i)

The unit (B-3) is derived from an aliphatic diol having a side-chain alkyl group or side-chain cycloalkyl group. Examples of the aliphatic diol having a side-chain alkyl group or side-chain cycloalkyl group include 1,3-butylene glycol, 2-methyl-1,3-propanediol, neopentyl glycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexane glycol, 1,2-octyl glycol, 2-ethyl-1,6-hexanediol, 2,3-diisobutyl-1,3-propanediol, 1,12-octadecanediol, 2,2-diisoamyl-1,3-propanediol, 2-methyl-2-propyl-1,3-propanediol, 2-cyclohexyl-1,3-propanediol, 2-methyl-1,4-cyclohexane dimethanol and 2,2,4,4-tetramethyl-1,3-cyclobutanediol.

Out of these, 3-methyl-1,5-pentanediol, 2-n-butyl-2-ethyl-1,3-propanediol, 2,2-diethyl-1,3-propanediol and 2,4-diethyl-1,5-pentanediol are preferred, and 2-n-butyl-2-ethyl-1,3-propanediol and 2,4-diethyl-1,5-pentanediol are particularly preferred. They may be used in combination of two or more.

The molar ratio (A/B-3) of the unit (A) and the unit (B-3) is preferably 50/50 to 95/5, more preferably 60/40 to 94/6, much more preferably 70/30 to 90/10. Within the above range, balance among heat resistance, weatherability, low water absorptivity, surface hardness and low-temperature impact characteristics is excellent advantageously. The molar ratio (A/B-3) can be calculated by measuring with the proton NMR of the JNM-AL400 of JEOL Ltd.

When the polycarbonate resin of the present invention is composed of only the unit (A) and the unit (B-3), the content of the unit (A) is preferably 50 to 94 mol % based on 100 mol % of the total of the unit (A) and the unit (B-3). The lower limit of the content of the unit (A) is preferably 60 mol %, more preferably 65 mol %, much more preferably 70 mol %. The upper limit of the content of the unit (A) is preferably 90 mol %, more preferably 87 mol %, much more preferably 85 mol %. The remainder is the unit (B-3).

As a diol compound deriving another unit except for the unit (A) and the unit (B-3), a monomer compound deriving the above unit (B-1), an aliphatic diol compound, alicyclic diol compound and aromatic dihydroxy compound except for the monomer compound may be used. Examples thereof include diol compounds described in WO2004/111106 and WO2011/021720 and oxyalkylene glycols such as diethylene glycol, triethylene glycol, tetraethylene glycol and polyethylene glycol.

The aliphatic dihydroxy compounds, alicyclic dihydroxy compounds and aromatic dihydroxy compounds are the same as the above-described compounds.

The copolycarbonate resin containing the unit (A) and the unit (B-3) is produced by reaction means known per se for producing an ordinary polycarbonate resin, for example, a method in which a diol component is reacted with a carbonate precursor such as carbonic diester. The basic means in these production methods is the same as the means for the copolycarbonate resin containing the unit (A) and the unit (B-1).

(Terminal Group)

The polycarbonate resin of the present invention contains a terminal group represented by the following formula (1) or (2). The content of the terminal group represented by the following formula (1) or (2) is preferably 5 to 95 mol %, more preferably 7 to 93 mol %, much more preferably 10 to 90 mol %, further more preferably 15 to 80 mol %, particularly preferably 20 to 75 mol %, most preferably 23 to 70 mol % based on the total of all the terminal groups. When the content of the terminal group is higher than the lower limit, the effect of distilling off an aromatic monohydroxy compound becomes high and when the content is lower than the upper limit, the polymerization degree becomes high advantageously.

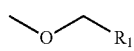

(1)

In the above formula (1), $R_1$ is an alkyl group having 6 to 15 carbon atoms which may be substituted, alkoxy group having 6 to 15 carbon atoms which may be substituted, aryl group having 6 to 14 carbon atoms which may be substituted, alkenyl group having 6 to 15 carbon atoms which may be substituted, or aralkyl group having 7 to 15 carbon atoms which may be substituted. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkyl group having 6 to 15 carbon atoms is preferably 7 to 14, more preferably 8 to 13. Examples of the alkyl group include hexyl group, heptyl group, octyl group, nonyl group, decyl group, undecyl group, dodecyl group and pentadecyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkoxy group having 6 to 15 carbon atoms is preferably 7 to 14, more preferably 8 to 13. Examples of the alkoxy group include hexyloxy group, heptoxy group, octyloxy group, nonyloxy group, decyloxy group, undecyloxy group, dodecyloxy group and pentadecyloxy group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the aryl group having 6 to 14 carbon atoms is preferably 6 to 12, more preferably 7 to 11. Examples of the aryl group include phenyl group and naphthyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkenyl group having 6 to 15 carbon atoms is preferably 7 to 14, more preferably 8 to 13. Examples of the alkenyl group include hexenyl group, heptenyl group, octenyl group, nonenyl group, decenyl group, undecenyl group, dodecenyl group and pentadecenyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the aralkyl group having 7 to 15 carbon atoms is preferably 7 to 14, more preferably 8 to 13. Examples of the aralkyl group include benzyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

$R_1$ is preferably an alkyl group having 6 to 15 carbon atoms which may be substituted.

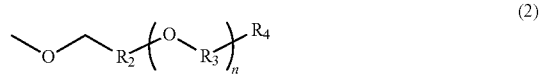

(2)

In the above formula (2), $R_2$ and $R_3$ are each independently an alkylene group having 1 to 12 carbon atoms which may be substituted, arylene group having 6 to 14 carbon atoms which may be substituted, alkenylene group having 2 to 12 carbon atoms which may be substituted, arylalkylene group having 7 to 15 carbon atoms which may be substituted, or alkylarylene group having 7 to 15 carbon atoms which may be substituted.

The number of carbon atoms of the alkylene group having 1 to 12 carbon atoms is preferably 1 to 9, more preferably 2 to 6. Examples of the alkylene group include methylene group, ethylene group, trimethylene group, butylene group, pentylene group, hexylene group, octylene group, nonylene group, decylene group, undecylene group and dodecylene group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the arylene group having 6 to 14 carbon atoms is preferably 6 to 12, more preferably 6 to 10. Examples of the arylene group include phenylene group and naphthalenediyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkenylene group having 2 to 12 carbon atoms is preferably 3 to 10, more preferably 3 to 8. Examples of the alkenylene group include ethenylene group, propenylene group, butenylene group, pentenylene group, hexenylene group, octenylene group and nonylenine group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the arylalkylene group having 7 to 15 carbon atoms is preferably 7 to 14, more preferably 7 to 12. Examples of the arylalkylene group include phenylenebis(methylene) group and phenylethylene group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkylarylene group having 7 to 15 carbon atoms is preferably 7 to 14, more preferably 7 to 12. Examples of the alkylarylene group include methylphenylene group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

In the formula (2), n is an integer of 1 to 20, preferably 1 to 10, more preferably 1 to 5.

In the formula (2), $R_4$ is a hydrogen atom, alkyl group having 1 to 12 carbon atoms which may be substituted, aryl group having 6 to 14 carbon atoms which may be substituted, alkenyl group having 2 to 12 carbon atoms which may be substituted, or aralkyl group having 7 to 15 carbon atoms which may be substituted.

The number of carbon atoms of the alkyl group having 1 to 12 carbon atoms is preferably 1 to 10, more preferably 1 to 8. Examples of the alkyl group include methyl group, ethyl group, trimethyl group, butyl group, pentyl group, hexyl group, octyl group, nonyl group, decyl group, undecyl group and dodecyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the aryl group having 6 to 14 carbon atoms is preferably 6 to 12, more preferably 6 to 10. Examples of the aryl group include phenyl group and naphthyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the alkenyl group having 2 to 12 carbon atoms is preferably 2 to 10, more preferably 2 to 8. Examples of the alkenyl group include ethenyl group, propenyl group, butenyl group, pentenyl group, hexenyl group, octenyl group and nonylenyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The number of carbon atoms of the aralkyl group having 7 to 15 carbon atoms is preferably 7 to 14, more preferably 7 to 12. Examples of the aralkyl group include benzyl group and phenethyl group. Examples of the substituent include methyl group, ethyl group, propyl group including structural isomers, butyl group including structural isomers, cyclohexyl group, phenyl group, methoxy group, ethoxy group, propoxy group including structural isomers, butoxy group including structural isomers, cyclohexyloxy group and phenoxy group.

The polycarbonate resin of the present invention contains a phenyl group terminal (terminal derived from a carbonic diester used as a raw material) and an OH group terminal (terminal derived from a dihydroxy compound containing isosorbide used as a raw material) as terminal groups except for the formula (1) or (2).

The content of the phenyl group terminal is preferably 5 to 90 mol %, more preferably 6 to 80 mol %, much more preferably 8 to 70 mol %, most preferably 10 to 60 mol % based on the total of all the terminal groups.

The content of the OH group terminal is preferably 10 to 90 mol %, more preferably 12 to 70 mol %, much more preferably 13 to 60 mol %, most preferably 15 to 50 mol % based on the total of all the terminal groups.

Examples of the alcohol compound deriving the terminal group represented by the above formula (1) or (2) include heptanol, octanol, nonanol, decanol, undecanol, dodecanol, tridecanol, tetradecanol, phenoxy ethanol, phenoxy propanol, phenoxy butanol, phenoxy pentanol, phenoxy hexanol, phenoxy heptanol, phenoxy octanol, cyclohexane methanol, cyclohexane ethanol, cyclohexane propanol, cyclohexane butanol, cyclohexane pentanol, cyclohexane butanol, cyclohexane pentanol, cyclohexane hexanol, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, tetraethylene glycol monomethyl ether, tetraethylene glycol monoethyl ether, tetraethylene glycol monopropyl ether, tetraethylene glycol monobutyl ether, tetraethylene glycol monopentyl ether, tetraethylene glycol monohexyl ether, polyethylene glycol monomethyl ether, polyethylene glycol monoethyl ether, polyethylene glycol monopropyl ether, polyethylene glycol monobutyl ether, polyethylene glycol monopentyl ether, polyethylene glycol monohexyl ether, dipropylene glycol monomethyl ether, dipropylene glycol monoethyl ether, dipropylene glycol monopropyl ether, dipropylene glycol monobutyl ether, dipropylene glycol monopentyl ether, dipropylene glycol monohexyl ether, tripropylene glycol monomethyl ether, tripropylene glycol monoethyl ether, tripropylene glycol monopropyl ether, tripropylene glycol monobutyl ether, tripropylene glycol monopentyl ether, tripropylene glycol monohexyl ether, tetrapropylene glycol monoethyl ether, tetrapropylene glycol monopropyl ether, tetrapropylene glycol monobutyl ether, tetrapropylene glycol monopentyl ether and tetrapropylene glycol monohexyl ether. Out of these, decanol, undecanol, dodecnol, tridecanol, tetradecanol, phenoxy ethanol, phenoxy propanol and phenoxy butanol are preferred, decanol, undecanol, dodecanol, tridecanol and phenoxy ethanol are more preferred, and phenoxy ethanol is particularly preferred.

Although long-chain alkyl alcohols such as decanol, undecanol, dodecanol, tridecanol and tetradecanol have the great effect of distilling off an aromatic monohydroxy compound, the glass transition temperature of the obtained polycarbonate lowers, thereby limiting the use of the polycarbonate. A polycarbonate resin obtained from an alcohol including an aromatic alcohol such as phenoxy ethanol is more preferred as its glass transition temperature rarely lowers.

To form a film having excellent ultraviolet transmittance, $R_1$ is preferably an alkyl group having 6 to 15 carbon atoms which may be substituted or alkoxy group having 6 to 15 carbon atoms which may be substituted in the above formula (1), and $R_2$ and $R_3$ are preferably each independently an alkylene group having 1 to 12 carbon atoms which may be substituted and $R_4$ is preferably a hydrogen atom or alkyl group having 1 to 12 carbon atoms which may be substituted in the above formula (2). The content of the terminal group represented by the formula (1) or (2) is preferably 10 to 90 mol %, more preferably 20 to 85 mol %, much more preferably 30 to 82 mol %, particularly preferably 40 to 80 mol % based on the total of all the terminal groups.

(Content of Aromatic Monohydroxy Compound)

The content of the aromatic monohydroxy compound remaining in the polycarbonate resin of the present invention is 0.1 to 500 ppm, preferably 1 to 300 ppm, more preferably 10 to 250 ppm, particularly preferably 50 to 200 ppm. When the content of the aromatic monohydroxy compound is higher than 500 ppm, molding stability and hue deteriorate disadvantageously. Although the lower content of the aromatic monohydroxy is more preferred, not less than 0.1 ppm of the aromatic monohydroxy remains in the polymer. When the content of the aromatic monohydroxy compound is lower than 500 ppm, a film formed from the polycarbonate resin is excellent in ultraviolet transmittance. In the present invention, when a polycarbonate resin having a carbonate constituent unit derived from a specific aliphatic dihydroxy compound typified by isosorbide as the main chain is to be produced, the polymerization reaction time for obtaining a polycarbonate resin having a desired molecular weight can be adjusted and the pressure reduction time at the time of the polymerization reaction can be prolonged by containing a specific amount of a specific alcohol compound during the polymerization reaction, thereby making it possible to obtain a polycarbonate resin containing a terminal group derived from the specific alcohol compound and having a low content of the aromatic monohydroxy compound.

(Specific Viscosity: $\eta_{sp}$)

The specific viscosity ($\eta_{sp}$) of the polycarbonate resin of the present invention is preferably 0.18 to 0.5, more preferably 0.21 to 0.47, much more preferably 0.24 to 0.45, particularly preferably 0.26 to 0.42, more particularly preferably 0.27 to 0.40, most preferably 0.30 to 0.38. When the specific viscosity of the polycarbonate resin is not less than 0.18, strength becomes sufficiently high and when the specific viscosity is not more than 0.5, moldability becomes high.

The specific viscosity as used in the present invention is obtained from a solution prepared by dissolving 0.7 g of the polycarbonate resin in 100 ml of methylene chloride at 20° C. by using an Ostwald viscometer.

$$\text{Specific viscosity}(\eta_{sp}) = (t - t_0)/t_0$$

["$t_0$" is the number of seconds required for the dropping of methylene chloride, and "t" is the number of seconds required for the dropping of a sample solution]

The measurement of the specific viscosity can be carried out, for example, by the following procedure. The polycarbonate resin is first dissolved in methylene chloride in an amount which is 20 to 30 times the weight of the polycarbonate resin, soluble matter is collected by cerite filtration, the solution is removed, and the residue is fully dried to obtain a methylene chloride-soluble solid. The specific viscosity at 20° C. is obtained from a solution prepared by dissolving 0.7 g of the solid in 100 ml of methylene chloride by using an Ostwald viscometer.

(Glass Transition Temperature: Tg)

The glass transition temperature (Tg) of the polycarbonate resin of the present invention is preferably 70 to 150° C., more preferably 90 to 140° C., much more preferably 100 to 135° C., particularly preferably 110 to 130° C.

When the glass transition temperature (Tg) of the polycarbonate resin is 70° C. or higher, the heat resistance of an optical molded body formed therefrom becomes satisfactory. When the glass transition temperature (Tg) of the polycarbonate resin is 150° C. or lower, moldability at the time of injection molding becomes high. The glass transition temperature (Tg) is measured at a temperature elevation rate of 20° C./min by using the 2910 DSC of TA Instruments Japan.

(Photoelastic Coefficient)

The photoelastic coefficient of the polycarbonate resin of the present invention is preferably not more than $30 \times 10^{-12}$ $Pa^{-1}$, more preferably not more than $28 \times 10^{-12}$ $Pa^{-1}$, particularly preferably not more than $20 \times 10^{-12}$ $Pa^{-1}$. When the photoelastic coefficient is not more than $30 \times 10^{-12}$ $Pa^{-1}$, optical strain is hardly produced by stress, whereby the polycarbonate resin is preferably used for displays.

(Pencil Hardness)

The polycarbonate resin of the present invention preferably has a pencil hardness of at least HB. The pencil hardness is preferably at least F, more preferably at least H as the polycarbonate resin is excellent in scratch resistance. The term "pencil hardness" means such hardness that when the resin of the present invention is scratched with a pencil having specific pencil hardness, no scratch mark is left. Pencil hardness used in the surface hardness test of a coating film which can be measured in accordance with JIS K-5600 is used as an index. The pencil hardness becomes lower in the order of 9H, 8H, 7H, 6H, 5H, 4H, 3H, 2H, H, F, HB, B, 2B, 3B, 4B, 5B and 6B, 9H is the hardest, and 6B is the softest.

(Total Light Transmittance)

The total light transmittance of a molded article having a thickness of 1 mm formed from the polycarbonate resin of the present invention is preferably not less than 80%, more preferably not less than 88%, much more preferably not less than 90%, particularly preferably not less than 91%. When the total light transmittance is not less than 80%, the visibility of a sheet or film for use in displays obtained from the polycarbonate resin becomes excellent advantageously. The total light transmittance can be measured by using the Haze Meter NDH-2000 of Nippon Denshoku Industries Co., Ltd in accordance with ISO13468.

<Polycarbonate Resin Production Method>

The polycarbonate resin of the present invention is produced by reaction means known per se for producing an ordinary polycarbonate resin, for example, a method in which a diol component is reacted with a carbonate precursor such as a carbonic diester. A brief description is subsequently given of basic means for these production methods.

A transesterification reaction using a carbonic diester as the carbonate precursor is carried out in an inert gas atmosphere by stirring a diol component and the carbonic diester in a predetermined ratio under heating and distilling off the formed alcohol or phenol. The reaction can be divided into three steps: step A, step B and step C.

The step A is the step of carrying out transesterification to ensure that the specific viscosity of the polycarbonate resin becomes 0.01 or more to less than 0.03. The transesterification reaction is carried out at a resin temperature of 120° C. or higher to lower than 190° C. and a vacuum degree of 10 to 1 kPa.

The step B is the step of carrying out transesterification to ensure that the specific viscosity of the polycarbonate resin becomes 0.03 or more to less than 0.1. The transesterification reaction is carried out at a resin temperature of 170° C. or higher to lower than 190° C. and a vacuum degree of 2 to 0.1 kPa.

The step C is the step of carrying out transesterification to ensure that the specific viscosity of the polycarbonate resin becomes 0.1 to 0.6. The transesterification reaction is carried out at a resin temperature of 190° C. or higher to lower than 250° C. and a vacuum degree of not higher than 0.5 kPa.

A dissolution tank may be provided separately besides the reaction steps.

In the step A, when transesterification is carried out to ensure that the specific viscosity of the polycarbonate resin becomes 0.01 or more to less than 0.03, preferably, the resin temperature is 140° C. or higher to lower than 180° C. and the vacuum degree is 5 to 2 kPa.

In the step B, when transesterification is carried out to ensure that the specific viscosity of the polycarbonate resin becomes 0.03 or more to less than 0.1, preferably, the resin temperature is 175° C. or higher to lower than 190° C. and the vacuum degree is 1.5 to 0.5 kPa.

In the step C, when transesterification is carried out to ensure that the specific viscosity of the polycarbonate resin becomes 0.1 to 0.6, preferably, the resin temperature is 196° C. or higher to lower than 240° C. and the vacuum degree is 0.3 kPa or lower.

In these steps, at least two reactors are connected in series so that a reaction product from the outlet of a first reactor goes into a second reactor. The number of reactors to be connected is not particularly limited but preferably 2 to 7, more preferably 3 to 5, much more preferably 3 to 4. Although the types of the reactors are not particularly limited, preferably, reactors for the pre-stage reaction include at least one vertical stirring reactor and reactors for the post-stage reaction include at least one horizontal stirring reactor. The former reactors and the latter reactors may be connected directly only by a pipe or may be connected via a preheater as required. The pipe is preferably a double pipe which can carry the reaction solution without cooling and solidifying it and has no vapor phase on the polymer side and no dead space.

Any known reactors may be used. For example, jacket type reactors or reactors incorporating a coiled heat transmission tube both of which contain hot oil or steam as a heat medium may be used. A capacitor may be used to flocculate a monohydroxy compound which is a reaction by-product. A known type of the capacitor may be used, and the temperature of the heat medium in the capacitor in the step A is preferably 35 to 50° C. It is more preferably 35 to 45° C.

The reaction system in the method of producing the polycarbonate resin of the present invention is preferably batch or continuous system. The reactors are a plurality of vertical stirring reactors, or the vertical stirring reactors and at least one horizontal stirring reactor connected after these reactors. These reactors are connected in series to carry out the reaction for each batch or continuously.

After the polycondensation step, the step of devolatilizing and removing a monohydroxy compound which is an unreacted raw material or reaction by-product contained in the polycarbonate, the step of adding a heat stabilizer, antioxidant, release agent or colorant and the step of forming a pellet having a predetermined diameter from the obtained polycarbonate may be suitably added. After the monohydroxy compound such as a phenol produced in the above reactors is collected in a tank and purified to be recovered as required from the viewpoint of the effective use of resources, it is preferably re-used as a raw material for diphenol carbonate or bisphenol A. In the production method of the present invention, the method of purifying the by-produced monohydroxy compound is not particularly limited but a distillation method is preferably used.

In the present invention, an alcohol compound represented by the following formula (a) or (b) is used.

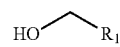
(a)

(In the above formula, $R_1$ is as defined in the above formula (1).)

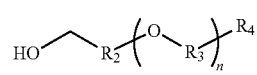
(b)

(In the above formula, $R_2$, $R_3$, $R_4$ and n are as defined in the above formula (2).)

That is, the method of producing the polycarbonate resin of the present invention preferably includes the step of reacting a dihydroxy compound containing isosorbide, a carbonic diester and an alcohol compound represented by the above formula (a) or (b).

The amount of the alcohol compound used in the present invention is preferably 0.1 to 10 mol % based on the total of all dihydroxy compounds. It is more preferably 0.1 to 5 mol %, much more preferably 0.3 to 4.5 mol %, particularly preferably 0.5 to 4 mol %, most preferably 1 to 3 mol %. When the amount is not less than 0.1 mol %, the effect of distilling off the aromatic monohydroxy compound becomes high and when the amount is not more than 10 mol %, the terminal is hardly sealed with a large amount of the alcohol compound and the polymerization degree is kept high advantageously.

The boiling point (normal pressure) of the alcohol compound used in the present invention is preferably 180 to 300° C. It is more preferably 185 to 280° C., particularly preferably 190 to 260° C. When the boiling point is 180° C. or higher, the alcohol compound is hardly distilled off in the initial stage of the reaction and the effect of distilling off the aromatic monohydroxy compound becomes high and when the boiling point is 300° C. or lower, the effect of distilling off the aromatic monohydroxy compound becomes high and physical properties and heat stability are not adversely affected advantageously.

The alcohol compound used in the present invention may be charged at the same time as the other raw materials or in the intermediate stage of the reaction or the latter stage of the reaction.

The carbonic diester used in the above transesterification reaction is an ester such as an aryl group having 6 to 12 carbon atoms which may be substituted or aralkyl group having 7 to 13 carbon atoms. Specific examples of the carbonic diester include diphenyl carbonate, ditolyl carbonate, bis(chlorophenyl) carbonate and m-cresyl carbonate. Out of these, diphenyl carbonate is particularly preferred. The amount of diphenyl carbonate is preferably 0.97 to 1.10 moles, more preferably 1.00 to 1.06 moles based on 1 mole of the total of all diol components.

(Polymerization Catalyst)

To accelerate the polymerization rate in the melt polymerization method, a polymerization catalyst may be used. Examples of the polymerization catalyst include alkali metal compounds, alkali earth metal compounds, basic phosphorus compounds, nitrogen-containing compounds and metal compounds.

As these compounds, organic salts, inorganic salts, oxides, hydroxides, hydrides, alkoxides and quaternary ammonium hydroxides of alkali metals and alkali earth metals are preferably used. These compounds may be used alone or in combination.

The alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenylphosphate, disodium salts, dipotassium salts, dicesium salts and dilithium salts of bisphenol A, and sodium salts, potassium salts, cesium salts and lithium salts of phenol.

The alkali earth metal compounds include magnesium hydroxide, calcium hydroxide, strontium hydroxide, barium hydroxide, magnesium carbonate, calcium carbonate, strontium carbonate, barium carbonate, calcium hydrogen carbonate, barium hydrogen carbonate, magnesium hydrogen carbonate, strontium hydrogen carbonate, magnesium diacetate, calcium diacetate, strontium diacetate and barium diacetate.

The sodium salts, potassium salts, lithium salts, calcium salts, barium salts, magnesium salts or strontium salts of basic boron compounds are sodium salts, potassium salts, lithium salts, calcium salts, barium salts, magnesium salts or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyl triphenylboron, methyl triphenylboron and butyl triphenylboron.

Preferably, the polymerization catalyst is a metal compound composed of an anion represented by the following formula (C) and a metal cation.

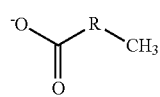

(C)

(In the above formula, R is a linear or branched alkylene group which may contain a cyclic structure and has 1 to 22 carbon atoms, cycloalkylene group or aralkyl group.)

In the above formula, R is preferably a linear alkylene group having 1 to 22 carbon atoms. The number of carbon atoms is preferably 4 to 22, particularly preferably 10 to 22. When the number of carbon atoms is 23 or more, the metal compound is hardly acquired disadvantageously.

Examples of the above metal compound include lithium propionate, sodium propionate, potassium propionate, cesium propionate, magnesium propionate, calcium propionate, strontium propionate, barium propionate, manganese propionate, zinc propionate, aluminum propionate, lithium butyrate, sodium butyrate, potassium butyrate, cesium butyrate, magnesium butyrate, calcium butyrate, strontium butyrate, barium butyrate, manganese butyrate, zinc butyrate, aluminum butyrate, lithium valerate, sodium valerate, potassium valerate, cesium valerate, magnesium valerate, calcium valerate, strontium valerate, barium valerate, manganese valerate, zinc valerate, aluminum valerate, lithium caproate, sodium caproate, potassium caproate, cesium caproate, magnesium caproate, calcium caproate, strontium caproate, barium caproate, manganese caproate, zinc caproate, aluminum caproate, lithium enanthate, sodium enanthate, potassium enanthate, cesium enanthate, magnesium enanthate, calcium enanthate, strontium enanthate, barium enanthate, manganese enanthate, zinc enanthate, aluminum enanthate, lithium caprylate, sodium caprylate, potassium caprylate, cesium caprylate, magnesium caprylate, calcium caprylate, strontium caprylate, barium caprylate, manganese caprylate, zinc caprylate, aluminum caprylate, lithium pelargonate, sodium pelargonate, potassium pelargonate, cesium pelargonate, magnesium pelargonate, calcium pelargonate, strontium pelargonate, barium pelargonate, manganese pelargonate, zinc pelargonate, aluminum pelargonate, lithium caprate, sodium caprate, potassium caprate, cesium caprate, magnesium caprate, calcium caprate, strontium caprate, barium caprate, manganese caprate, zinc caprate, aluminum caprate, lithium undecylate, sodium undecylate, potassium undecylate, cesium undecylate, magnesium undecylate, calcium undecylate, strontium undecylate, barium undecylate, manganese undecylate, zinc undecylate, aluminum undecylate, lithium laurate, sodium laurate, potassium laurate, cesium laurate, magnesium laurate, calcium laurate, strontium laurate, barium laurate, manganese laurate, zinc laurate, aluminum laurate, lithium tridecylate, sodium tridecylate, potassium tridecylate, cesium tridecylate, magnesium tridecylate, calcium tridecylate, strontium tridecylate, barium tridecylate, manganese tridecylate, zinc tridecylate, aluminum tridecylate, lithium myristate, sodium myristate, potassium myristate, cesium myristate, magnesium myristate, calcium myristate, strontium myristate, barium myristate, manganese myristate, zinc myristate, aluminum myristate, lithium pentadecylate, sodium pentadecylate, potassium pentadecylate, cesium pentadecylate, magnesium pentadecylate, calcium pentadecylate, strontium pentadecylate, barium pentadecylate, manganese pentadecylate, zinc pentadecylate, aluminum pentadecylate, lithium palmitate, sodium palmitate, potassium palmitate, cesium palmitate, magnesium palmitate, calcium palmitate, strontium palmitate, barium palmitate, manganese palmitate, zinc palmitate, aluminum palmitate, lithium margarate, sodium margarate, potassium margarate, cesium margarate, magnesium margarate, calcium margarate, strontium margarate, barium margarate, manganese margarate, zinc margarate, aluminum margarate, lithium stearate, sodium stearate, potassium stearate, cesium stearate, magnesium stearate, calcium stearate, strontium stearate, barium stearate, manganese stearate, zinc stearate, aluminum stearate, lithium nonadecylate, sodium nonadecylate, potassium nonadecylate, cesium nonadecylate, magnesium nonadecylate, calcium nonadecylate, strontium nonadecylate, barium nonadecylate, manganese nonadecylate, zinc nonadecylate, aluminum nonadecylate, lithium arachidate, sodium arachidate, potassium arachidate, cesium arachidate, magnesium arachidate, calcium arachidate, strontium arachidate, barium arachidate, manganese arachidate, zinc arachidate, aluminum arachidate, lithium heneicosylate, sodium heneicosylate, potassium heneicosylate, cesium heneicosylate, magnesium heneicosylate, calcium heneicosylate, strontium heneicosylate, barium heneicosylate, manganese heneicosylate, zinc heneicosylate, aluminum heneicosylate, lithium behenate, sodium behenate, potassium behenate, cesium behenate, magnesium behenate, calcium behenate, strontium behenate, barium behenate, manganese behenate, zinc behenate, aluminum behenate, lithium tricosylate, sodium tricosylate, potassium tricosylate, cesium tricosylate, magnesium tricosylate, calcium tricosylate, strontium tricosylate, barium tricosylate, manganese tricosylate, zinc tricosylate, aluminum tricosylate, lithium lignocerate, sodium lignocerate, potassium lignocerate, cesium lignocerate, magnesium lignocerate, calcium lignocerate, strontium lignocerate, barium lignocerate, manganese lignocerate, zinc lignocerate and aluminum lignocerate. They may be used alone or in combination.

The basic phosphorus compounds include triethylphosphine, tri-n-propylphosphine, triisopropylphosphine, tri-n-butylphosphine, triphenylphosphine, tributylphosphine and quaternary phosphonium salts.

The nitrogen-containing compounds include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole may be used. Bases and basic salts such as ammonia, tetramethylammonium borohydride, tetrabutylammonium borohydride, tetrabutylammonium tetraphenylborate and tetraphenylammonium tetraphenylborate may also be used.

The metal compounds include zinc aluminum compounds, germanium compounds, organic tin compounds, antimony compounds, manganese compounds, titanium compounds and zirconium compounds. These compounds may be used alone or in combination of two or more.

The amount of the polymerization catalyst is preferably $1\times10^{-9}$ to $1\times10^{-2}$ molar equivalent, more preferably $1\times10^{-8}$ to $1\times10^{-5}$ molar equivalent, much more preferably $1\times10^{-7}$ to $1\times10^{-3}$ molar equivalent based on 1 mole of the diol component.

(Catalyst Deactivator)

A catalyst deactivator may be added in the latter stage of the reaction. Known catalyst deactivators are used effectively as the catalyst deactivator. Out of these, ammonium salts and phosphonium salts of sulfonic acid are preferred. Salts of dodecylbenzenesulfonic acid such as tetrabutylphosphonium salts of dodecylbenzenesulfonic acid and salts of paratoluenesulfonic acid such as tetrabutylammonium salts of paratoluenesulfonic acid are more preferred.

As the ester of sulfonic acid, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used. Out of these, tetrabutylphosphonium salts of dodecylbenzenesulfonic acid are most preferably used.

As for the amount of the catalyst deactivator, when at least one polymerization catalyst selected from alkali metal compounds and/or alkali earth metal compounds is used, the catalyst deactivator is used in an amount of preferably 0.5 to 50 moles, more preferably 0.5 to 10 moles, much more preferably 0.8 to 5 moles based on 1 mole of the catalyst.

(Additives)

The polycarbonate resin of the present invention may comprise additives such as heat stabilizer, plasticizer, optical stabilizer, polymerization metal inactivating agent, flame retardant, lubricant, antistatic agent, surfactant, antibacterial agent, ultraviolet absorbent and release agent as required according to purpose.

The polycarbonate resin of the present invention may be used in combination with another resin as long as the effect of the present invention is not impaired.

(Heat Stabilizer)

The polycarbonate resin of the present invention preferably comprises a heat stabilizer in particular to suppress the reduction of molecular weight and the deterioration of hue at the time of extrusion/molding. Since the ether diol residue of the unit (A) tends to be deteriorated by heat and oxygen to be colored, a phosphorus-based stabilizer is preferably contained as the heat stabilizer. As the phosphorus-based stabilizer, a pentaerythritol type phosphite compound or a phosphite compound which reacts with a dihydric phenol and has a cyclic structure is preferably used.

Examples of the above pentaerythritol type phosphite compound include distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite. Out of these, distearyl pentaerythritol diphosphite and bis(2,4-di-tert-butylphenyl)pentaerythritol diphosphite are preferred.

Examples of the phosphite compound which reacts with a dihydric phenol and has a cyclic structure include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl)(2-tert-butyl-4-methylphenyl) phosphite, 2,2'-ethylidenebis(4-methyl-6-tert-butylphenyl)(2-tert-butyl-4-methylphenyl)phosphite, 2,2'-methylenebis(4,6-di-t-butylphenyl)octyl phosphite and 6-tert-butyl-4-[3-[(2,4,8,10)-tetra-tert-butyldibenzo[d,f][1,3,2]dioxaphosphepin-6-yl]oxy]propyl]-2-methylphenol.

The other phosphorus-based stabilizers include phosphite compounds except for the above compounds, phosphonite compounds and phosphate compounds.

The phosphite compounds include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl) phosphite, tris(di-n-butylphenyl)phosphite, tris(2,4-di-tert-butylphenyl)phosphite and tris(2,6-di-tert-butylphenyl) phosphite.

The phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

The phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred.

Tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted for two or more alkyl groups.

The phosphonate compounds include dimethyl benzene phosphonate, diethyl benzene phosphonate and dipropyl benzene phosphonate.

The above phosphorus-based stabilizers may be used alone or in combination of two or more, and at least a pentaerythritol type phosphite compound or a phosphite compound having a cyclic structure is preferably used in an effective amount. The phosphorus-based stabilizer is used in an amount of preferably 0.001 to 1 part by weight, more preferably 0.01 to 0.5 part by weight, much more preferably 0.01 to 0.3 part by weight based on 100 parts by weight of the polycarbonate resin.

A hindered phenol-based heat stabilizer may be added as the heat stabilizer to the polycarbonate resin of the present invention in order to suppress the reduction of molecular weight and the deterioration of hue at the time of extrusion/molding.

The hindered phenol-based stabilizer is not particularly limited if it has an antioxidant function. Examples of the hindered phenol-based stabilizer include n-octadecyl-3-(4'-hydroxy-3',5'-di-t-butylphenyl) propionate, tetrakis{methylene-3-(3',5'-di-t-butyl-4-hydroxyphenyl) propionate}methane, distearyl(4-hydroxy-3-methyl-5-t-butylbenzyl)malonate, triethylene glycol-bis{3-(3-t-butyl-5-methyl-4-hydroxyphenyl)propionate}, 1,6-hexanediol-bis{3-(3,5-di-t-butyl-4-hydroxyphenyl) propionate}, pentaerythrityl-tetrakis{3-(3,5-di-t-butyl-4-hydroxyphenyl) propionate}, 2,2-thiodiethylenebis{3-(3,5-di-t-butyl-4-hydroxyphenyl) propionate}, 2,2-thiobis(4-methyl-6-t-butyl-phenol), 1,3,5-trimethyl-2,4,6-tris(3,5-di-t-butyl-4-hydroxybenzyl)benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl) propionate, 2,5,7,8-tetramethyl-2(4',8',12'-trimethyltridecyl) chroman-6-ol and 3,3',3'',5,5',5''-hexa-t-butyl-a,a',a''-(mesitylene-2,4,6-triyl)tri-p-cresol.

Out of these, n-octadecyl-3-(4'-hydroxy-3',5'-di-t-butylphenyl) propionate, pentaerythrityl-tetrakis{3-(3,5-di-t-butyl-4-hydroxyphenyl)propionate}, 3,3',3'',5,5',5''-hexa-t-butyl-a,a',a''-(mesitylene-2,4,6-triyl)tri-p-cresol and 2,2-thiodiethylenebis{3-(3,5-di-t-butyl-4-hydroxyphenyl) propionate} are preferred. These hindered phenol-based stabilizers may be used alone or in combination of two or more.

The hindered phenol-based stabilizer is used in an amount of preferably 0.001 to 1 part by weight, more preferably 0.01 to 0.5 part by weight, much more preferably 0.01 to 0.3 part by weight based on 100 parts by weight of the polycarbonate resin.

(Release Agent)

The polycarbonate resin of the present invention may comprise a release agent to further improve its releasability from a mold at the time of melt molding as long as the object of the present invention is not impaired.

The release agent is selected from a higher fatty acid ester of a monohydric or polyhydric alcohol, higher fatty acid, paraffin wax, beeswax, olefin-based wax, olefin-based wax containing a carboxyl group and/or a carboxylic anhydride group, silicone oil and organopolysiloxane.

The higher fatty acid ester is preferably a partial ester or full ester of a monohydric or polyhydric alcohol having 1 to 20 carbon atoms and a saturated fatty acid having 10 to 30 carbon atoms. Examples of the partial ester or full ester of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate and 2-ethylhexyl stearate. Out of these, monoglyceride stearate, triglyceride stearate, pentaerythritol tetrastearate and behenyl behenate are preferably used.

The higher fatty acid is preferably a saturated fatty acid having 10 to 30 carbon atoms. Examples of the fatty acid include myristic acid, lauric acid, palmitic acid, stearic acid and behenic acid.

These release agents may be used alone or in combination of two or more. The amount of the release agent is preferably 0.01 to 5 parts by weight based on 100 parts by weight of the polycarbonate resin.

(Ultraviolet Absorbent)

The polycarbonate resin of the present invention may comprise an ultraviolet absorbent. The ultraviolet absorbent is selected from a benzotriazole-based ultraviolet absorbent, benzophenone-based ultraviolet absorbent, triazine-based ultraviolet absorbent, cyclic imino ester-based ultraviolet absorbent and cyanoacrylate-based ultraviolet absorbent. Out of these, the benzotriazole-based ultraviolet absorbent is preferred.

Examples of the benzotriazole-based ultraviolet absorbent include 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenyl benzotriazole, 2-[2'-hydroxy-3'-(3'',4'',5'',6''-tetraphthalimidomethyl)-5'-methylphenyl] benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2,2'-methylenebis[4-(1,1,3,3-tetramethylbutyl)-6-(2H-benzotriazol-2-yl)phenol] and condensate of methyl-3-[3-tert-butyl-5-(2H-benzotriazol-2-yl)-4-hydroxyphenylpropionate and polyethylene glycol.

The amount of the ultraviolet absorbent is preferably 0.03 to 2.5 parts by weight, more preferably 0.05 to 2.0 parts by weight, much more preferably 0.1 to 1.0 part by weight based on 100 parts by weight of the polycarbonate resin.

<Film>

The film of the present invention is formed from the above polycarbonate resin.

(Short-Wavelength Transmittance)

The transmittance at 260 nm of the film of the present invention is preferably not less than 30%, more preferably not less than 40%, much more preferably not less than 50%, particularly preferably not less than 60%, most preferably not less than 70%.

The transmittance at 280 nm of the film of the present invention is preferably not less than 20%, more preferably not less than 30%, much more preferably not less than 50%, particularly preferably not less than 60%, most preferably not less than 70%. The short-wavelength transmittance can be measured by a spectrophotometer described in Examples.

When the transmittance at 260 nm and the transmittance at 280 nm are higher than the above lower limit values, the film of the present invention becomes excellent in ultraviolet transmittance and is suitable for use as a film for agricultural houses, dust-proof film or food packaging film.

(Film Production Method)

The film of the present invention can be produced by known methods, for example, solution casting, melt extrusion, thermal pressing and calendering methods. Out of these, the melt extrusion method is particularly preferred as the method of producing the film of the present invention from the viewpoint of productivity.

In the melt extrusion method, preferably, a T die is used to extrude the resin and supply it onto a cooling roll. The temperature at this point which is determined from the molecular weight, Tg and melt flow characteristics of the resin composition is preferably 180 to 350° C., more preferably 200 to 320° C. When the temperature is lower than 180° C., viscosity becomes high, whereby the orientation and strain stress of the polymer tend to remain. When the temperature is higher than 350° C., problems such as heat deterioration, coloring and the formation of a die line (streak) from the T die tend to occur.

Since the polycarbonate resin used in the present invention has high solubility in an organic solvent, the solution casting method may also be employed. In the case of the solution casting method, methylene chloride, 1,2-dichloroethane, 1,1,2,2-tetrachloroethane, dioxolane and dioxane are preferably used as the solvent. The amount of the residual solvent in the film used in the solution casting method is preferably not more than 2 wt %, more preferably not more than 1 wt %. When the amount of the residual solvent is larger than 2 wt %, the glass transition temperature of the film greatly drops, which is not preferred from the viewpoint of heat resistance.

The thickness of the film is preferably 30 to 500 μm, more preferably 40 to 400 μm, much more preferably 50 to 200 μm.

EXAMPLES

The following examples are provided for the purpose of further illustrating the present invention but are in no way to be taken as limiting. "Parts" in the examples means "parts by weight". Resins and evaluation methods used in the examples are as follows.

1. Polymer Terminal Ratio (NMR)

Each of the recurring units was measured with the proton NMR of the JNM-AL400 of JEOL Ltd. to calculate the polymer terminal ratio (molar ratio).

2. Measurement of Specific Viscosity

This was obtained from a solution prepared by dissolving 0.7 g of the polycarbonate copolymer in 100 ml of methylene chloride at 20° C. by using an Ostwald viscometer.

$$\text{Specific viscosity}(\eta_{sp})=(t-t_0)/t_0$$

["$t_0$" is the number of seconds required for the dropping of methylene chloride, and "t" is the number of seconds required for the dropping of a sample solution]

3. Amount of Residual Phenol

After 1.5 g of the polycarbonate copolymer was dissolved in 15 ml of methylene chloride, 135 ml of acetonitrile was added, stirred and concentrated with an evaporator, and the resulting solution was filtered with a 0.2 μm filter, and HPLC analysis was made on 10 μl of this measurement solution at a column temperature of 30° C. and a detector wavelength of 277 nm by using the Develosil ODS-7 column of Nomura Chemical Co., Ltd., a mixed solution of 0.2% acetic acid water and acetonitrile as an elute acetonitrile and a gradient program.

4. Heat Stability Test

After 5 g of the polycarbonate copolymer was put into a test tube and heated at 280° C. for 15 minutes in a nitrogen atmosphere, the specific viscosity of the polycarbonate copolymer was measured. ○ means that there was a reduction of 5% or less from the initial specific viscosity, Δ means that there was a reduction of more than 5% to less than 8%, and X means that there was a reduction of 8% or more.

5. Hue (YI)

After the polycarbonate copolymer was dried at 100° C. for 6 hours, it was molded at a cylinder temperature of 240° C. and a mold temperature of 80° C. by means of an injection molding machine (JSWJ-75EIII of The Japan Steel Works, Ltd.) to obtain a molded test sample having a thickness of 2 mm. The YI value of the molded 2.0 mm-thick plate was calculated by the following equation based on ASTME1925 from X, Y and Z values obtained by measuring transmitted light with the Z-1001DP color difference meter of Nippon Denshoku Industries Co., Ltd. As the larger the YI value the stronger the yellow tinge of the molded plate becomes.

$$YI=[100(1.28X-1.06Z)]/Y$$

6. Ultraviolet Transmittance

The transmittances at 260 nm and 280 nm of a film having a thickness of 100 μm were measured by using the U-3310 spectrophotometer of Hitachi, Ltd.

Example 1

432 parts of isosorbide (to be abbreviated as "ISS" hereinafter), 84 parts of 1,9-nonanediol (to be abbreviated as "ND" hereinafter), 9.5 parts of phenoxy ethanol, 750 parts of diphenyl carbonate (to be abbreviated as "DPC" hereinafter) and 0.0025 part of barium stearate as a catalyst were heated at 120° C. in a nitrogen atmosphere to be molten. Thereafter, the resulting solution was supplied into a reaction tank, the heat medium temperature of a capacitor was adjusted to 40° C., the internal temperature of the resin was adjusted to 170° C., and the decompression degree was adjusted to 13.4 kPa over 30 minutes.

(Step A)

Thereafter, the decompression degree was adjusted to 3.4 kPa over 20 minutes, and the resin temperature was adjusted to 170° C. and kept at that temperature for 10 minutes to carry out sampling. The obtained sample had a specific viscosity of 0.023.

(Step B)

After the decompression degree was further adjusted to 0.9 kPa over 30 minutes and the internal temperature of the resin was adjusted to 180° C. and kept at that temperature for 10 minutes, sampling was carried out. The obtained sample had a specific viscosity of 0.081.

(Step C)

After the decompression degree was further adjusted to 0.2 kPa, the resin temperature was raised from 180° C. to 225° C. over 30 minutes, and specified viscosity was attained, the sample was discharged under nitrogen increased pressure from the bottom of the reaction tank and cut with a pelletizer while cooled in a water tank to obtain a pellet. When the specific viscosity and the amount of the residual phenol of the pellet were measured, the specific viscosity was 0.375 and the amount of the residual phenol was 164 ppm.

1,000 parts of the obtained polycarbonate resin and 0.3 part of tris(2,4-di-tert-butylphenyl)phosphite were extruded into a strand by using a vented double-screw extruder having a diameter of 30 mm, and the strand was cooled in 40° C. hot water and cut to obtain a resin pellet of the polycarbonate resin composition. Thereafter, the pellet was dried at 110° C. for 3 hours with a hot air circulation drier and molded at a cylinder temperature of 230° C. and a mold temperature of 80° C. by using an injection molding machine (JSWJ-75EIII of The Japan Steel Works, Ltd.) to obtain a 2 mm-thick plate test sample. The evaluation results are shown in Table 1.

Example 2

The same operation and the same evaluations as in Example 1 were made except that the amount of phenoxy ethanol was changed to 14.2 parts. The results are shown in Table 1. The specific viscosity of the sample of the step A was 0.021, the specific viscosity of the sample of the step B was 0.082, the specific viscosity of the pellet obtained after the step C was 0.317, and the amount of the residual phenol was 121 ppm.

Example 3

The same operation and the same evaluations as in Example 1 were made except that the amount of phenoxy ethanol was changed to 2.4 parts. The results are shown in Table 1. The specific viscosity of the sample of the step A was 0.025, the specific viscosity of the sample of the step B was 0.087, the specific viscosity of the pellet obtained after the step C was 0.367, and the amount of the residual phenol was 463 ppm.

Example 4

The same operation and the same evaluations as in Example 1 were made except that the amount of phenoxy ethanol was changed to 9.5 parts and the amount of tridecanol was changed to 13.8 parts. The results are shown in Table 1. The specific viscosity of the sample of the step A was 0.026, the specific viscosity of the sample of the step B was 0.086, the specific viscosity of the pellet obtained after the step C was 0.358, and the amount of the residual phenol was 231 ppm.

Example 5

The same operation and the same evaluations as in Example 1 were made except that the amount of phenoxy ethanol was changed to 9.5 parts and the amount of decanol was changed to 10.8 parts. The results are shown in Table 1. The specific viscosity of the sample of the step A was 0.019, the specific viscosity of the sample of the step B was 0.078, the specific viscosity of the pellet obtained after the step C was 0.387, and the amount of the residual phenol was 98 ppm.

Example 6

The same operation and the same evaluations as in Example 1 were made except that 356 parts of ISS, 151 parts of 1,4-cyclohexane dimethanol (to be abbreviated as "CHDM" hereinafter), 9.5 parts of phenoxy ethanol and 750 parts of DPC were used as raw materials. The results are shown in Table 1. The specific viscosity of the sample of the step A was 0.021, the specific viscosity of the sample of the step B was 0.083, the specific viscosity of the pellet obtained after the step C was 0.352, and the amount of the residual phenol was 153 ppm.

Example 7

The same operation and the same evaluations as in Example 1 were made except that 254 parts of ISS, 251 parts of CHDM, 9.5 parts of phenoxy ethanol and 750 parts of DPC were used as raw materials. The results are shown in Table 1. The specific viscosity of the sample of the step A was 0.029, the specific viscosity of the sample of the step B was 0.091, the specific viscosity of the pellet obtained after the step C was 0.423, and the amount of the residual phenol was 168 ppm.

Comparative Example 1

The same operation and the same evaluations as in Example 1 were made except that phenoxy ethanol was not used. The results are shown in Table 1. The specific viscosity of the sample of the step A was 0.024, the specific viscosity of the sample of the step B was 0.092, the specific viscosity of the pellet obtained after the step C was 0.359, and the amount of the residual phenol was 2,983 ppm.

Comparative Example 2

The same operation and the same evaluations as in Example 1 were made except that 0.96 part of phenoxy ethanol was used. The results are shown in Table 1. The specific viscosity of the sample of the step A was 0.021, the specific viscosity of the sample of the step B was 0.089, the specific viscosity of the pellet obtained after the step C was 0.360, and the amount of the residual phenol was 2,550 ppm.

Comparative Example 3

The same operation and the same evaluations as in Example 1 were made except that 7.0 parts of hexanol was used in place of 9.5 parts of phenoxy ethanol. The results are shown in Table 1. The specific viscosity of the sample of the step A was 0.023, the specific viscosity of the sample of the step B was 0.093, the specific viscosity of the pellet obtained after the step C was 0.385, and the amount of the residual phenol was 2,855 ppm.

Comparative Example 4

The same operation and the same evaluations as in Example 1 were made except that 18.5 parts of stearyl alcohol was used in place of 9.5 parts of phenoxy ethanol. The results are shown in Table 1. The specific viscosity of the sample of the step A was 0.025, the specific viscosity of the sample of the step B was 0.087, the specific viscosity of the pellet obtained after the step C was 0.276, and the amount of the residual phenol was 2,582 ppm.

Comparative Example 5

The same operation and the same evaluations as in Example 1 were made except that 21.2 parts of pentadecyl phenol was used in place of 9.5 parts of phenoxy ethanol. The results are shown in Table 1. The specific viscosity of the sample of the step A was 0.022, the specific viscosity of the sample of the step B was 0.074, the specific viscosity of the pellet obtained after the step C was 0.246, and the amount of the residual phenol was 2,897 ppm.

cut with a pelletizer while cooled in a water tank to obtain a pellet. When the specific viscosity and the amount of the

TABLE 1

| | Constituent monomers (molar ratio) | | | | type of alcohol | boiling point of alcohol | amount of alcohol |
|---|---|---|---|---|---|---|---|
| | Recurring unit (A) | | Recurring unit (B) | | — | ° C. | mol % |
| Ex. 1 | ISS | 85 | ND | 15 | phenoxy ethanol | 240 | 2 |
| Ex. 2 | ISS | 85 | ND | 15 | phenoxy ethanol | 240 | 3 |
| Ex. 3 | ISS | 85 | ND | 15 | phenoxy ethanol | 240 | 0.5 |
| Ex. 4 | ISS | 85 | ND | 15 | Tridcanol | 255 | 2 |
| Ex. 5 | ISS | 85 | ND | 15 | Decanol | 230 | 4 |
| Ex. 6 | ISS | 70 | CHDM | 30 | phenoxy ethanol | 240 | 2 |
| Ex. 7 | ISS | 50 | CHDM | 50 | phenoxy ethanol | 240 | 2 |
| C. Ex. 1 | ISS | 85 | ND | 15 | — | — | 0 |
| C. Ex. 2 | ISS | 85 | ND | 15 | phenoxy ethanol | 240 | 0.2 |
| C. Ex. 3 | ISS | 85 | ND | 15 | Hexanol | 157 | 2 |
| C. Ex. 4 | ISS | 85 | ND | 15 | Stearyl alcohol | 351 | 2 |
| C. Ex. 5 | ISS | 85 | ND | 15 | Pentadecyl phenol | >380 | 2 |

| | Specific viscosity | terminal alcohol % | terminal phenyl group % | terminal OH group % | residual PhOH ppm | heat stability test | YI |
|---|---|---|---|---|---|---|---|
| Ex. 1 | 0.375 | 24 | 37 | 39 | 164 | ○ | 1.9 |
| Ex. 2 | 0.317 | 32 | 28 | 40 | 121 | ○ | 1.8 |
| Ex. 3 | 0.367 | 8 | 56 | 36 | 463 | Δ | 2.1 |
| Ex. 4 | 0.358 | 28 | 39 | 33 | 231 | ○ | 1.9 |
| Ex. 5 | 0.387 | 65 | 17 | 18 | 98 | ○ | 1.8 |
| Ex. 6 | 0.352 | 26 | 35 | 39 | 153 | ○ | 1.8 |
| Ex. 7 | 0.423 | 29 | 41 | 30 | 168 | ○ | 1.8 |
| C. Ex. 1 | 0.359 | — | 55 | 45 | 2983 | X | 1.7 |
| C. Ex. 2 | 0.360 | 3 | 54 | 43 | 2550 | X | 2.7 |
| C. Ex. 3 | 0.385 | 4 | 56 | 40 | 2855 | X | 2.8 |
| C. Ex. 4 | 0.276 | 73 | 16 | 11 | 2582 | X | 2.6 |
| C. Ex. 5 | 0.246 | 69 | 14 | 17 | 2897 | X | 2.8 |

Ex.: Example
C. Ex.: Comparative Example

Example 8

432 parts of isosorbide (ISS), 84 parts of 1,9-nonanediol (to be abbreviated as "ND" hereinafter), 20.9 parts of tridecanol, 750 parts of diphenyl carbonate (to be abbreviated as "DPC" hereinafter) and 0.0025 part of barium stearate as a catalyst were heated at 120° C. in a nitrogen atmosphere to be molten. Thereafter, the resulting solution was supplied into a reaction tank, the heat medium temperature of a capacitor was adjusted to 40° C., the internal temperature of the resin was adjusted to 170° C. and the decompression degree was adjusted to 13.4 kPa over 30 minutes.
(Step A)

Thereafter, the decompression degree was adjusted to 3.4 kPa over 20 minutes, and the resin temperature was adjusted to 170° C. and kept at that temperature for 10 minutes to carry out sampling. The obtained sample had a specific viscosity of 0.021.
(Step B)

The decompression degree was further adjusted to 0.9 kPa over 30 minutes, and the resin temperature was adjusted to 180° C. and kept at that temperature for 10 minutes to carry out sampling. The obtained sample had a specific viscosity of 0.080.
(Step C)

After the decompression degree was further adjusted to 0.2 kPa, the resin temperature was raised from 180° C. to 225° C. over 30 minutes, and specified viscosity was attained, the sample was discharged under nitrogen increased pressure from the bottom of the reaction tank and residual phenol of the pellet were measured, the specific viscosity was 0.358 and the amount of the residual phenol was 120 ppm.
(Film Formation)

Then, a vacuum hopper whose vacuum degree was adjusted to 1 kPa or less and a T die having a width of 650 mm were set in a 40 mm-diameter single-screw extruder, and the obtained polycarbonate resin pellet was formed at 240° C. to obtain a transparent extrusion film having a thickness of 100 μm. The transmittance of the obtained film was measured.

Example 9

The same operation and the same evaluations as in Example 8 were made except that 22.1 parts of decanol was used in place of 20.9 parts of tridecanol. The specific viscosity of the sample of the step A was 0.022, the specific viscosity of the sample of the step B was 0.084, the specific viscosity of the pellet obtained after the step C was 0.387, and the amount of the residual phenol was 132 ppm. The results are shown in Table 2.

Example 10

The same operation and the same evaluations as in Example 8 were made except that 27.6 parts of decanol was used in place of 20.9 parts of tridecanol. The specific viscosity of the sample of the step A was 0.018, the specific viscosity of the sample of the step B was 0.077, the specific viscosity of the pellet obtained after the step C was 0.387, and the amount of the residual phenol was 86 ppm. The results are shown in Table 2.

Example 11

The same operation and the same evaluations as in Example 8 were made except that 356 parts of ISS, 151 parts of 1,4-cyclohexane dimethanol (to be abbreviated as "CHDM" hereinafter), 22.1 parts of decanol and 750 parts of DPC were used as raw materials. The specific viscosity of the sample of the step A was 0.023, the specific viscosity of the sample of the step B was 0.082, the specific viscosity of the pellet obtained after the step C was 0.352, and the amount of the residual phenol was 125 ppm. The results are shown in Table 2.

Example 12

The same operation and the same evaluations as in Example 8 were made except that 254 parts of ISS, 251 parts of 1,4-cyclohexane dimethanol (to be abbreviated as "CHDM" hereinafter), 22.1 parts of decanol and 750 parts of DPC were used as raw materials. The specific viscosity of the sample of the step A was 0.025, the specific viscosity of the sample of the step B was 0.092, the specific viscosity of the pellet obtained after the step C was 0.423, and the amount of the residual phenol was 106 ppm. The results are shown in Table 2.

Example 13

The same operation and the same evaluations as in Example 8 were made except that 254 parts of ISS, 251 parts of 1,4-cyclohexane dimethanol (to be abbreviated as "CHDM" hereinafter), 11.1 parts of decanol and 750 parts of DPC were used as raw materials. The specific viscosity of the sample of the step A was 0.027, the specific viscosity of the sample of the step B was 0.095, the specific viscosity of the pellet obtained after the step C was 0.432, and the amount of the residual phenol was 248 ppm. The results are shown in Table 2.

Comparative Example 6

The same operation and the same evaluations as in Example 8 were made except that tridecanol was not used. The specific viscosity of the sample of the step A was 0.024, the specific viscosity of the sample of the step B was 0.092, the specific viscosity of the pellet obtained after the step C was 0.359, and the amount of the residual phenol was 2,983 ppm. The results are shown in Table 2.

Comparative Example 7

The same operation as in Example 8 was carried out after a low-molecular weight material was devolatilized from a vent by the water-pouring devolatilization of the polycarbonate obtained in Comparative Example 6 with a 30 mm-diameter double-screw extruder. The results are shown in Table 2. The specific viscosity of the sample of the step A was 0.024, the specific viscosity of the sample of the step B was 0.092, the specific viscosity of the pellet obtained after the step C was 0.354, and the amount of the residual phenol was 581 ppm.

Comparative Example 8

The same operation and the same evaluations as in Example 8 were made except that 7.0 parts of hexanol was used in place of 20.9 parts of tridecanol. The results are shown in Table 2. The specific viscosity of the sample of the step A was 0.023, the specific viscosity of the sample of the step B was 0.093, the specific viscosity of the pellet obtained after the step C was 0.385, and the amount of the residual phenol was 2,855 ppm.

Comparative Example 9

The same operation and the same evaluations as in Example 8 were made except that 18.5 parts of stearyl alcohol was used in place of 20.9 parts of tridecanol. The results are shown in Table 2. The specific viscosity of the sample of the step A was 0.025, the specific viscosity of the sample of the step B was 0.087, the specific viscosity of the pellet obtained after the step C was 0.276, and the amount of the residual phenol was 2,582 ppm.

Comparative Example 10

The same operation and the same evaluations as in Example 8 were made except that 21.1 parts of pentadecyl phenol was used in place of 20.9 parts of tridecanol. The results are shown in Table 2. The specific viscosity of the sample of the step A was 0.022, the specific viscosity of the sample of the step B was 0.074, the specific viscosity of the pellet obtained after the step C was 0.246, and the amount of the residual phenol was 2,897 ppm.

TABLE 2

|  | Constituent monomers (molar ratio) | | | | type of alcohol | boiling point of alcohol | amount of alcohol |
| --- | --- | --- | --- | --- | --- | --- | --- |
|  | Recurring unit (A) | | Recurring unit (B) | — |  | ° C. | mol % |
| Ex. 8 | ISS | 85 | ND | 15 | Tridcanol | 255 | 3 |
| Ex. 9 | ISS | 85 | ND | 15 | Decanol | 230 | 4 |
| Ex. 10 | ISS | 85 | ND | 15 | Decanol | 230 | 5 |
| Ex. 11 | ISS | 70 | CHDM | 30 | Decanol | 230 | 4 |
| Ex. 12 | ISS | 50 | CHDM | 50 | Decanol | 230 | 4 |
| Ex. 13 | ISS | 50 | CHDM | 50 | Decanol | 230 | 2 |
| C. Ex. 6 | ISS | 85 | ND | 15 | — | — | 0 |
| C. Ex. 7 | ISS | 85 | ND | 15 | — | — | 0 |
| C. Ex. 8 | ISS | 85 | ND | 15 | Hexanol | 157 | 2 |
| C. Ex. 9 | ISS | 85 | ND | 15 | Stearyl alcohol | 351 | 2 |
| C. Ex. 10 | ISS | 85 | ND | 15 | Pentadecyl phenol | >380 | 2 |

TABLE 2-continued

| | Specific viscosity | terminal alcohol % | terminal phenyl group % | terminal OH group % | residual PhOH ppm | transmittance 260 nm % | transmittance 280 nm % |
|---|---|---|---|---|---|---|---|
| Ex. 8 | 0.358 | 69 | 12 | 19 | 120 | 74 | 75 |
| Ex. 9 | 0.387 | 65 | 16 | 19 | 132 | 73 | 74 |
| Ex. 10 | 0.387 | 76 | 9 | 15 | 86 | 76 | 78 |
| Ex. 11 | 0.352 | 68 | 11 | 21 | 125 | 74 | 76 |
| Ex. 12 | 0.423 | 71 | 12 | 17 | 106 | 73 | 74 |
| Ex. 13 | 0.432 | 52 | 25 | 23 | 248 | 56 | 58 |
| C. Ex. 6 | 0.359 | — | 55 | 45 | 2983 | 10 | 8 |
| C. Ex. 7 | 0.354 | — | 46 | 54 | 581 | 12 | 10 |
| C. Ex. 8 | 0.385 | 4 | 56 | 40 | 2855 | 11 | 9 |
| C. Ex. 9 | 0.276 | 73 | 16 | 11 | 2582 | 13 | 11 |
| C. Ex. 10 | 0.246 | 69 | 14 | 17 | 2897 | 9 | 7 |

Ex.: Example
C. Ex.: Comparative Example

INDUSTRIAL FEASIBILITY

Since the polycarbonate resin of the present invention is excellent in hue and heat stability, it can be used for various purposes such as optical, disk, display, automobile, electric and electronic and decoration purposes. The film of the present invention has excellent transmittance at a specific wavelength (ultraviolet light) and can be used as a film for agricultural houses, dust-proof film, food packaging film or lighting cover (especially cover for ultraviolet lamps).

The invention claimed is:

1. A polycarbonate resin having a carbonate constituent unit represented by the following formula (A), wherein the polycarbonate resin contains a terminal group represented by the following formula (1) or (2), which is a residue of an alcohol compound having a boiling point at normal pressure of 190 to 300° C., and 0.1 to 500 ppm of an aromatic monohydroxy compound,

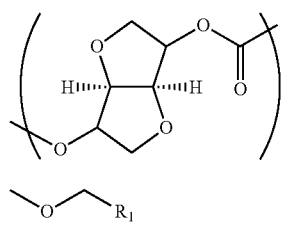
(A)

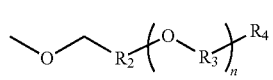
(1)

wherein $R_1$ is an alkyl group having 6 to 15 carbon atoms which may be substituted, an alkoxy group having 6 to 15 carbon atoms which may be substituted, an aryl group having 6 to 14 carbon atoms which may be substituted, an alkenyl group having 6 to 15 carbon atoms which may be substituted, or an aralkyl group having 7 to 15 carbon atoms which may be substituted, (2)

wherein $R_2$ and $R_3$ are each independently an alkylene group having 1 to 12 carbon atoms which may be substituted, an arylene group having 6 to 14 carbon atoms which may be substituted, an alkenylene group having 2 to 12 carbon atoms which may be substituted, an arylalkylene group having 7 to 15 carbon atoms which may be substituted, or an alkylarylene group having 7 to 15 carbon atoms which may be substituted, wherein $R_4$ is a hydrogen atom, an alkyl group having 1 to 12 carbon atoms which may be substituted, an aryl group having 6 to 14 carbon atoms which may be substituted, an alkenyl group having 2 to 12 carbon atoms which may be substituted, or an aralkyl group having 7 to 15 carbon atoms which may be substituted, n is an integer of 1 to 20.).

2. The polycarbonate resin according to claim 1, wherein the content of the carbonate constituent unit represented by the formula (A) is 50 to 94 mol % based on the total of all carbonate constituent units.

3. The polycarbonate resin according to claim 1, further comprising a carbonate constituent unit represented by the following formula (B-1),

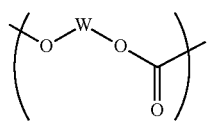
(B-1)

wherein W is an alkylene group having 2 to 30 carbon atoms, a cycloalkylene group having 6 to 30 carbon atoms or —CH$_2$—Z—CH$_2$—, wherein Z is a cycloalkylene group having 6 to 30 carbon atoms, wherein the molar ratio (A/B-1) of the unit (A) and the unit (B-1) is 60/40 to 90/10.

4. The polycarbonate resin according to claim 1, wherein the formula (A) represents a carbonate constituent unit derived from isosorbide.

5. The polycarbonate resin according to claim 1, wherein the content of the terminal group represented by the formula (1) or (2) is 10 to 90 mol % based on the total of all terminal groups.

6. The polycarbonate resin according to claim 1, wherein the specific viscosity of a 20° C. methylene chloride solution of the polycarbonate resin is 0.18 to 0.5.

7. A method of producing the polycarbonate resin of claim 1, comprising the step of reacting a dihydroxy compound containing isosorbide, a carbonic diester and an alcohol compound having a boiling point at normal pressure of 190 to 300° C. represented by the following formula (a) or (b),

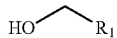 (a)

wherein R₁ is as defined in the above formula (1),

 (b)

wherein R₂, R₃, R₄ and n are as defined in the above formula (2).

8. The production method according to claim 7, wherein the alcohol compound represented by the formula (a) or (b) is reacted in an amount of 0.1 to 5 mol % based on the total of all dihydroxy compounds.

9. The production method according to claim 7, wherein the alcohol compound represented by the formula (a) or (b) has a boiling point at normal pressure of 230 to 300° C.

10. A film made of the polycarbonate resin of claim 1.

11. The film made of the polycarbonate resin of claim 1, wherein $R_1$ is an alkyl group having 6 to 15 carbon atoms which may be substituted or an alkoxy group having 6 to 15 carbon atoms which may be substituted in the formula (1), $R_2$ and $R_3$ are each independently an alkylene group having 1 to 12 carbon atoms which may be substituted, $R_4$ is a hydrogen atom or alkyl group having 1 to 12 carbon atoms which may be substituted, and n is an integer of 1 to 20 in the formula (2).

12. The film according to claim 11 which has a transmittance at 260 nm of not less than 30% and a transmittance at 280 nm of not less than 20%.

13. The film according to claim 11 which is a film for agricultural houses, dust-proof film or food packaging film.

* * * * *